United States Patent
Martin et al.

(10) Patent No.: US 10,677,964 B2
(45) Date of Patent: Jun. 9, 2020

(54) LENS WAFER ASSEMBLY AND ASSOCIATED METHOD FOR MANUFACTURING A STEPPED SPACER WAFER

(71) Applicant: OmniVision Technologies, Inc., Santa Clara, CA (US)

(72) Inventors: Alan Martin, San Jose, CA (US); Edward Nabighian, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 243 days.

(21) Appl. No.: 15/791,006

(22) Filed: Oct. 23, 2017

(65) Prior Publication Data

US 2019/0121003 A1    Apr. 25, 2019

(51) Int. Cl.
*G02B 3/08* (2006.01)
*G02B 3/00* (2006.01)
(Continued)

(52) U.S. Cl.
CPC ......... *G02B 3/0075* (2013.01); *G02B 3/0012* (2013.01); *G02B 3/0056* (2013.01); *G02B 7/021* (2013.01); *G02B 13/0085* (2013.01)

(58) Field of Classification Search
CPC .. G02B 3/0075; G02B 3/0056; G02B 3/0012; G02B 3/0018; G02B 3/0062;
(Continued)

(56) References Cited

U.S. PATENT DOCUMENTS 3,771,872 A    11/1973   Nightingale
5,977,535 A    11/1999   Rostoker
(Continued)

FOREIGN PATENT DOCUMENTS

CN    1838420    9/2006
CN    1924628    3/2007
(Continued)

OTHER PUBLICATIONS

Non-Final Office Action dated Feb. 6, 2014 for U.S. Appl. No. 13/293,937, 9 pp.
(Continued)

*Primary Examiner* — Mustak Choudhury
(74) *Attorney, Agent, or Firm* — Lathrop GPM LLP

(57) ABSTRACT

A method for manufacturing a stepped spacer wafer for a wafer-level camera includes a step of measuring a plurality of focal lengths $f_{1,2,\ldots,N}$ of a respective one of a plurality of lenses $L_{1,2,\ldots,N}$ of a lens wafer. The method also includes a step of fabricating a stepped spacer wafer including (i) a plurality of apertures $A_{1,2,\ldots,N}$ therethrough, and (ii) a plurality of thicknesses $T_{1,2,\ldots,N}$ defining a respective thickness of the stepped spacer wafer at least partially surrounding a respective one of the plurality of apertures $A_{1,2,\ldots,N}$. Each of the plurality of thicknesses $T_{1,2,\ldots,N}$ is equal to a difference between (a) a respective one of the plurality of focal lengths $f_{1,2,\ldots,N}$, and (b) a uniform thickness that is the same for each of the plurality of thicknesses.

8 Claims, 5 Drawing Sheets

(51) Int. Cl.
*G02B 7/02* (2006.01)
*G02B 13/00* (2006.01)

(58) Field of Classification Search
CPC .... G02B 3/0068; G02B 3/025; G02B 13/003; G02B 13/006; G02B 13/0035; G02B 13/0085; G02B 17/021; G03B 7/02; G03B 7/021; G02F 1/133351; G02F 1/1345; G02F 1/13439; G02F 1/134309; G02F 1/1347; B32B 37/0084; B32B 37/18; B32B 37/24; B32B 37/26; B32B 37/1208; B29D 11/00365; B29D 11/00461; H01L 27/14618; H01L 27/14625; H01L 27/14627; H01L 27/14683; H01L 27/14632; H01L 27/14685; H04N 5/2253; H04N 5/2257; H04N 5/23238; H04N 5/23296; H04N 5/332; H04N 5/35545; H04N 5/357; H04N 5/23232
USPC ........ 359/619, 741, 796, 811, 819; 348/340, 348/218.1, 265, 374; 428/131, 212, 336, 428/411.1, 413, 321; 427/162; 257/432; 349/139

See application file for complete search history.

(56) References Cited

U.S. PATENT DOCUMENTS

| | | | |
|---|---|---|---|
| 6,027,595 | A | 2/2000 | Suleski |
| 6,096,155 | A | 8/2000 | Harden |
| 6,124,974 | A | 9/2000 | Burger |
| 6,324,010 | B1 | 11/2001 | Bowen |
| 6,669,803 | B1 | 12/2003 | Kathman |
| 6,765,603 | B2 | 7/2004 | Border et al. |
| 7,088,419 | B2 | 8/2006 | Dowski, Jr. et al. |
| 7,378,724 | B2 | 5/2008 | Yu et al. |
| 7,710,667 | B2 | 5/2010 | Oliver et al. |
| 7,876,417 | B2 | 1/2011 | Dowski, Jr. et al. |
| 8,059,341 | B2 | 11/2011 | Lin et al. |
| 2003/0189705 | A1 | 10/2003 | Pardo |
| 2007/0010122 | A1 | 1/2007 | Wang |
| 2007/0029277 | A1 | 2/2007 | Jacobowitz et al. |
| 2007/0243662 | A1 | 10/2007 | Johnson |
| 2008/0008894 | A1 | 1/2008 | Abdo et al. |
| 2008/0136956 | A1 | 5/2008 | Yu et al. |
| 2008/0225390 | A1 | 9/2008 | Chang et al. |
| 2009/0034088 | A1 | 2/2009 | Delaney |
| 2009/0225431 | A1 | 9/2009 | Lee |
| 2009/0284837 | A1* | 11/2009 | Lake ............... B29D 11/00365 359/619 |
| 2010/0025868 | A1 | 2/2010 | Louh |
| 2010/0208354 | A1 | 8/2010 | Okazaki |
| 2011/0032409 | A1 | 2/2011 | Rossi et al. |
| 2011/0069395 | A1 | 3/2011 | Lin et al. |
| 2011/0080487 | A1 | 4/2011 | Venkataraman et al. |
| 2011/0181854 | A1 | 7/2011 | Ovrutsky et al. |
| 2011/0292271 | A1 | 12/2011 | Lin et al. |
| 2011/0304930 | A1 | 12/2011 | Welch |
| 2013/0122247 | A1 | 5/2013 | Barnes et al. |
| 2014/0299587 | A1* | 10/2014 | Rudmann ......... H01L 27/14618 219/121.69 |

FOREIGN PATENT DOCUMENTS

| | | |
|---|---|---|
| CN | 102012633 | 4/2011 |
| KR | 2009077435 | 7/2009 |
| TW | 200503066 | 1/2005 |
| TW | 1267150 | 11/2006 |
| TW | 200703636 | 1/2007 |
| TW | 1289352 | 11/2007 |
| TW | 201111855 | 4/2011 |
| WO | WO 2004027880 | 4/2004 |
| WO | WO 2008011003 | 1/2008 |
| WO | WO 2008020899 | 2/2008 |

OTHER PUBLICATIONS

Non-Final Office Action dated Aug. 20, 2014 for U.S. Appl. No. 13/293,937, 15 pp.
Final Office Action dated Dec. 1, 2014 for U.S. Appl. No. 13/293,937, 12 pp.
Advisory Action dated Feb. 13, 2015 for U.S. Appl. No. 13/293,937, 5 pp.
Non-Final Office Action dated May 12, 2015 for U.S. Appl. No. 13/293,937, 15 pp.
Final Office Action dated Sep. 23, 2015 for U.S. Appl. No. 13/293,937, 21 pp.
Non-Final Office Action dated Jun. 2, 2016 for U.S. Appl. No. 13/293,937, 13 pp.
Final Office Action dated Nov. 28, 2016 for U.S. Appl. No. 13/293,937, 15 pp.
U.S. Appl. No. 13/296,901 Office Action dated Feb. 11, 2014, 8 pp.
Notice of Allowance dated Jun. 5, 2014 for U.S. Appl. No. 13/296,901, 12 pp.
Translation of the Taiwanese Office Action corresponding to Taiwanese Patent Application No. 101136075, received Oct. 5, 2016, 3 pp.
Translation of the 3rd Office Action corresponding to Chinese Patent Application No. 201210430686.9, dated Apr. 18, 2016, 9 pp.
Taiwanese Patent Application 101136075 Office Action and translation dated Oct. 30, 2015, 13 pp.
Taiwanese Patent Application 101136075 Office Action and translation dated Nov. 29, 2014, 13 pp.
Chinese Patent Application 201210430686.9 Office Action and translation dated Oct. 23, 2015, 19 pp.
Chinese Patent Application 2015022701096160 Office Action with translation dated Mar. 3, 2015, 22 pp.
Brueck, "There are No Fundamental Limits to Optical Lithography", SPIE Press, The International Society for Optical Engineering, vol. V, (2002), pp. 85-109.
Volkel, et al., "Miniaturized Imaging Systems", Elsevier Science B.V., (2003), pp. 461-472.
Pitchumani, et al., "Additive Lithography for Fabrication of Diffractive Optics", Applied Optics, vol. 41, No. 29, (2002), pp. 6176-6181.

* cited by examiner

LENS WAFER ASSEMBLY AND ASSOCIATED METHOD FOR MANUFACTURING A STEPPED SPACER WAFER

BACKGROUND

Many high-volume consumer products such as mobile devices and motor vehicles now include a digital camera. Such digital cameras include mounted lenses manufactured via a batch process the yields many such mounted lenses. Ideally, each mounted lens has an identical focal length equal to a predetermined focal length. Due to manufacturing limitations, each mounted lens has a respective focal length that differs from the predetermined focal length by a respective misfocus distance, which results in lowered yield of mounted lenses that are unusable in the aforementioned consumer products. Embodiments disclosed herein are directed toward increasing this yield.

SUMMARY OF THE EMBODIMENTS

In a first aspect, a method for manufacturing a stepped spacer wafer for a wafer-level camera is disclosed. The method includes a step of measuring a plurality of focal lengths $f_{1,2,\ldots,N}$ of a respective one of a plurality of lenses $L_{1,2,\ldots,N}$ of a lens wafer. The method also includes a step of fabricating a stepped spacer wafer including (i) a plurality of apertures $A_{1,2,\ldots,N}$ therethrough, and (ii) a plurality of thicknesses $T_{1,2,\ldots,N}$ defining a respective thickness of the stepped spacer wafer at least partially surrounding a respective one of the plurality of apertures $A_{1,2,\ldots,N}$. Each of the plurality of thicknesses $T_{1,2,\ldots,N}$ is equal to a difference between (a) a respective one of the plurality of focal lengths $f_{1,2,\ldots,N}$, and (b) a uniform thickness that is the same for each of the plurality of thicknesses.

In a second aspect, a lens array assembly including a lens wafer and a stepped spacer wafer is disclosed. The lens wafer includes a plurality of lenses $L_{1,2,\ldots,N}$ arranged in a two-dimensional array, each having a respective focal length $f_{1,2,\ldots,N}$. The stepped spacer wafer includes (i) a plurality of apertures $A_{1,2,\ldots,N}$ therethrough, and (ii) a plurality of thicknesses $T_{1,2,\ldots,N}$ defining a respective thickness of the stepped spacer wafer at least partially surrounding a respective one of the plurality of apertures $A_{1,2,\ldots,N}$. Each of the plurality of thicknesses $T_{1,2,\ldots,N}$ is equal to a difference between (a) a respective one of the plurality of focal lengths $f_{1,2,\ldots,N}$, and (b) a uniform thickness that is the same for each of the plurality of thicknesses.

DETAILED DESCRIPTION OF THE EMBODIMENTS

Figure 1:
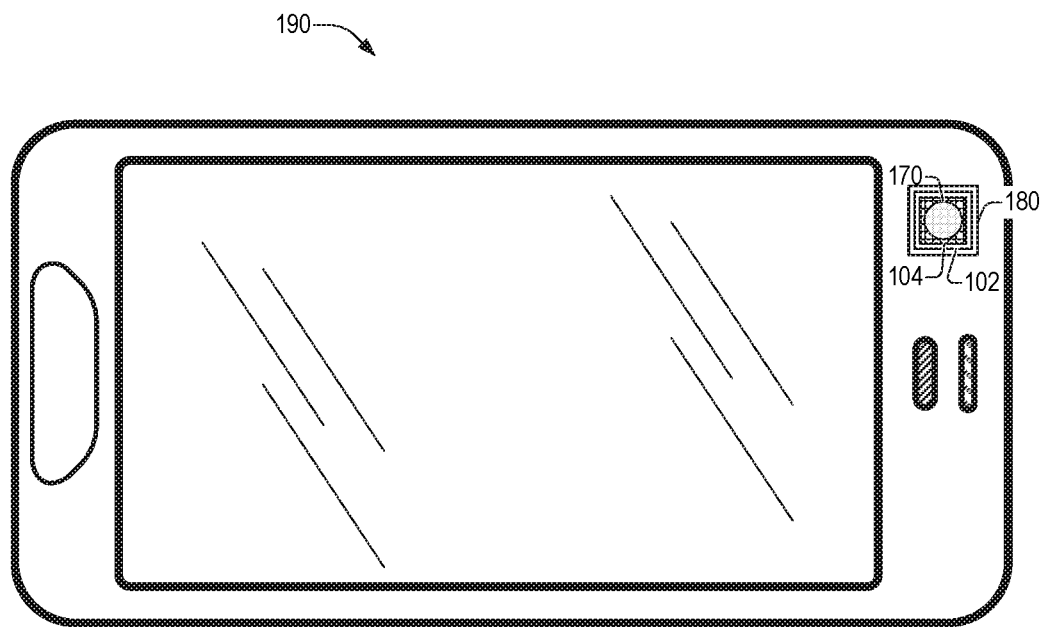
FIG. 1 shows a mobile device having a camera module integrated therein, in embodiments.

FIG. 1 shows a mobile device 190 having a camera module 180 integrated therein. Camera module 180 includes an image sensor 102 beneath an imaging lens 170. Image sensor 102 includes a pixel array 104.

Figure 2:
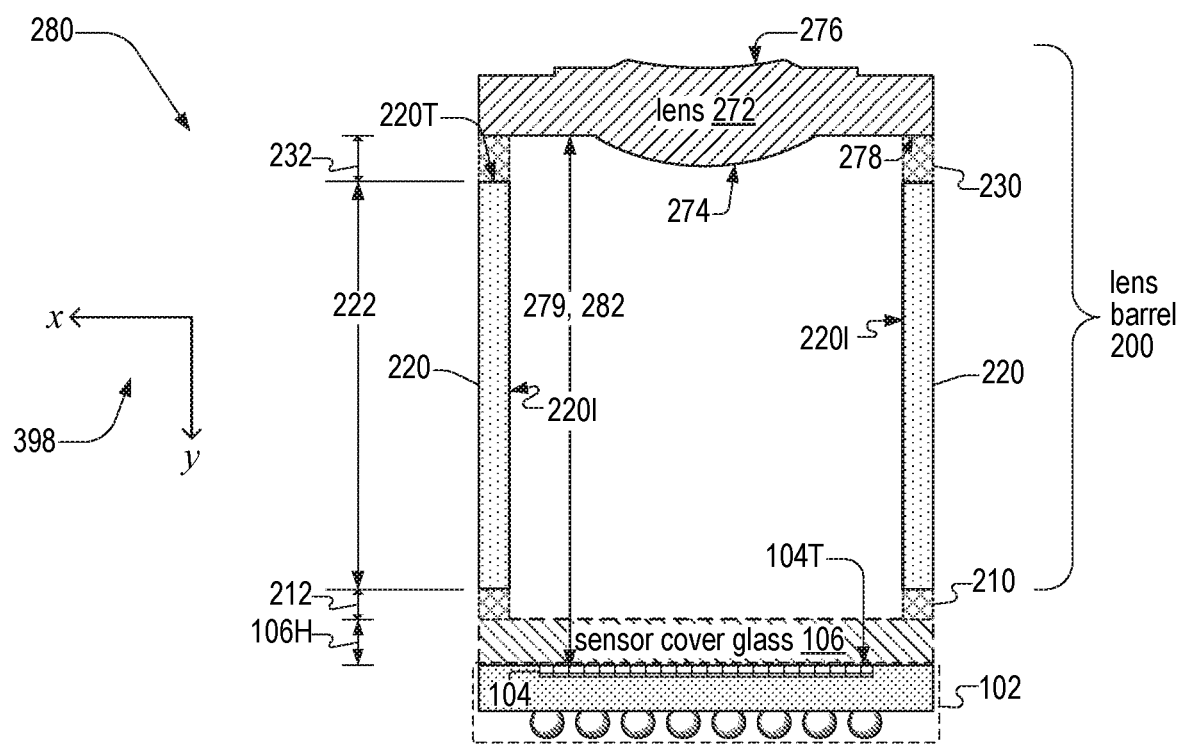
FIG. 2 is a cross-sectional view of a camera module that includes a spacer, the camera module being an example of the camera module of FIG. 1, in an embodiment.

FIG. 2 is a cross-sectional view of a camera module 280, which is an example of camera module 180. Camera module 280 includes a lens barrel 200 and image sensor 102. Lens barrel 200 includes a spacer 220 and a lens 272. Spacer 220 has a top surface 220T and an interior surface 220I. Lens 272 has a flange surface 278 on a top surface 220T of spacer 220. Camera module 280 may also include at least one of a sensor cover glass 106 and a bottom adhesive layer 210. Lens barrel 200 may include a top adhesive layer 230.

Lens 272 includes a back surface 274 and a front surface 276. While surfaces 274 and 276 are illustrated as convex and concave respectively, each of surfaces 274 and 276 may be either convex, concave, or a combination thereof. While lens 272 may be monolithic, as illustrated in FIG. 2, it may be formed of more than one piece without departing from the scope hereof.

Spacer 220 may be bonded to image sensor 102, for example via adhesive layer 210. Top adhesive layer 230 may bond lens 272 to top surface 220T. Flange surface 278 may directly contact top surface 220T or may attach to top surface 220T via top adhesive layer 230.

Lens 272 has a focal length 279 with respect to flange surface 278. Pixel array 104 has a top surface 104T. Cover glass 106, spacer 220, layer 210, and layer 230 have respective thicknesses 106H, 222, 212, and 232 such that a distance 282 between top surface 104T and flange surface 278 equals focal length 279. Denoting the sum of thicknesses 106H, 222, and 232 as a discretionary thickness, the sum of thickness 222 and the discretionary thickness equals focal length 279. The value of the discretionary thickness varies according to the presence of absence of cover glass 106, adhesive layer 210, and adhesive layer 230 in camera module 280. For example, when camera module 280 includes adhesive layers 210 and 230 and lacks cover glass 106, distance 282 equals the sum of thicknesses 222, 212, and 232, which equals focal length 279.

Figure 3:
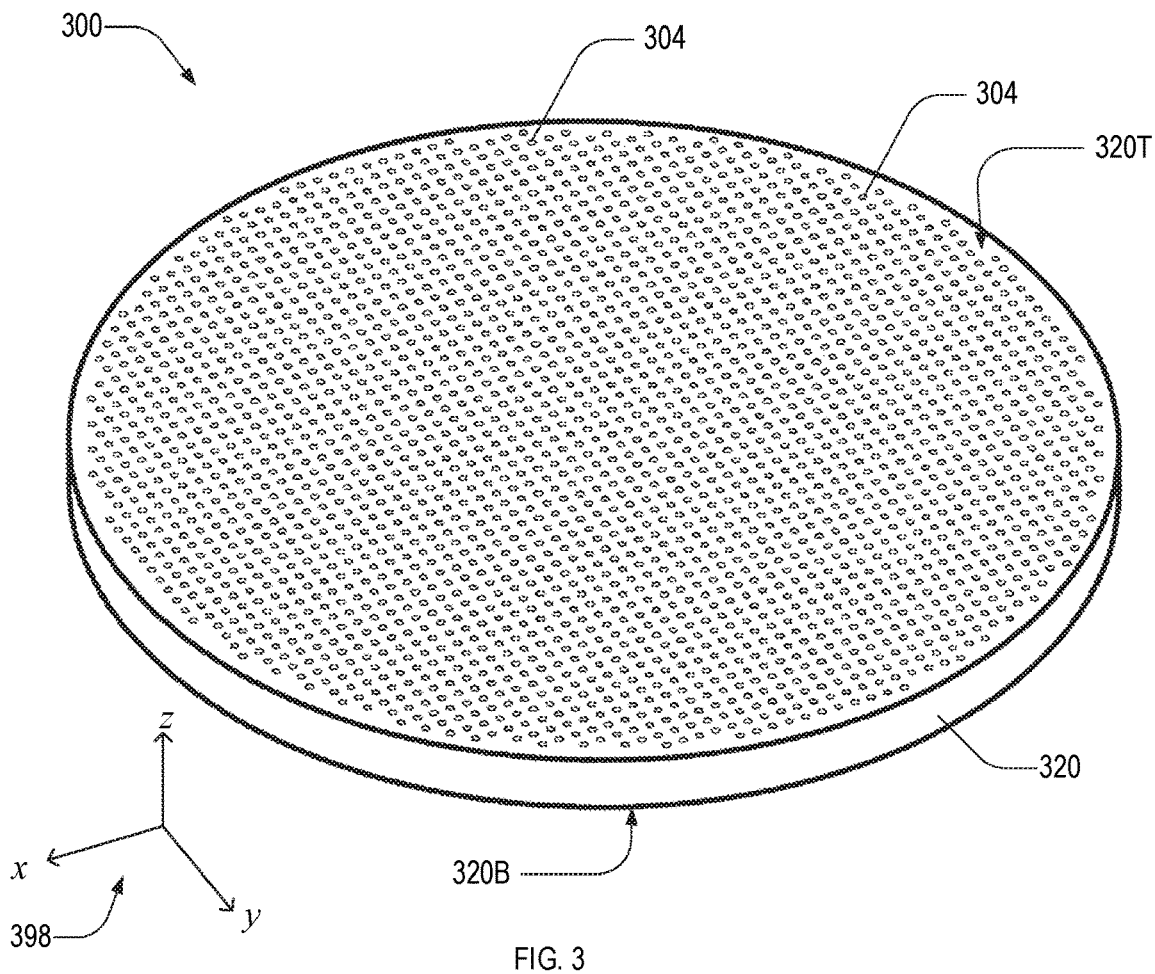
FIGS. 3 and 4 are, respectively, a graphical projection and a plan view of an embodiment of a stepped spacer wafer, from which the spacer of the camera module of FIG. 2 may be formed.
Figure 4:
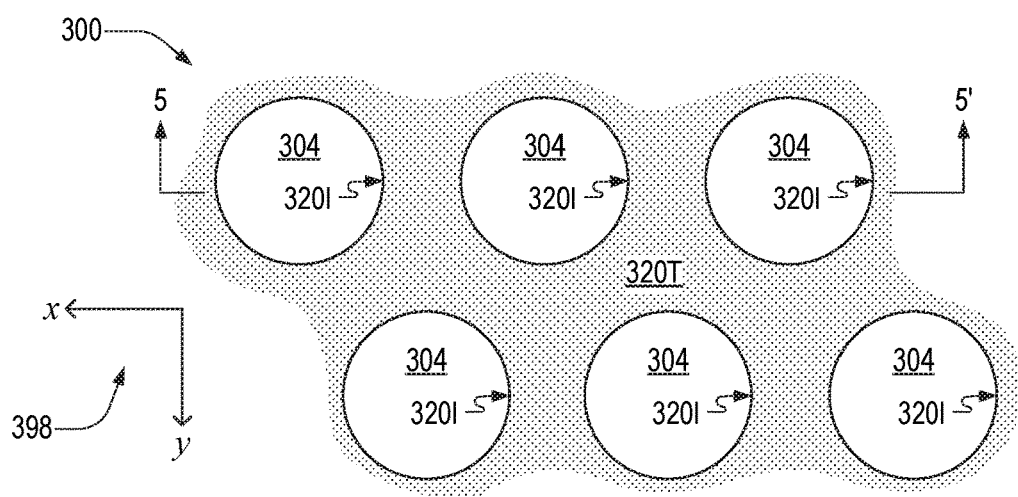

Many spacers 220 may be formed by singulating a stepped spacer wafer, such as stepped spacer wafer 300 of FIGS. 3 and 4. FIGS. 3 and 4 are, respectively, a graphical projection and a plan view of stepped spacer wafer 300. Stepped spacer wafer 300 includes a slab 320 that has a top surface 320T opposite a bottom surface 320B. Both surfaces 320T and 320B may be planar and parallel to the x-y plane of a coordinate system 398. Slab 320 forms a plurality of apertures 304 through both top surface 320T and bottom surface 320B such that each of the plurality of apertures 304 is bounded by an interior surface 320I of the slab 320. Interior surface 320I corresponds to interior surface 220I of spacer 220. Herein and unless stated otherwise, references to directions and planes denoted by at least one of x, y, or z refer to coordinate system 398.

Apertures 304 may be arranged in a periodic array, such as a square, rectangular, triangular, or hexagonal array. Apertures 304 may also be arranged aperiodically, quasiperiodically, or randomly. In a cross-section of stepped spacer wafer 300 between top surface 320T and bottom surface 320B, an aperture 304 may have any closed shape, such as that of a circle, ellipse, polygon, or a combination thereof. An aperture 304 may have a width between 0.2 mm and 10 mm, for example, between 0.4 mm and 3.0 mm.

Figure 5:
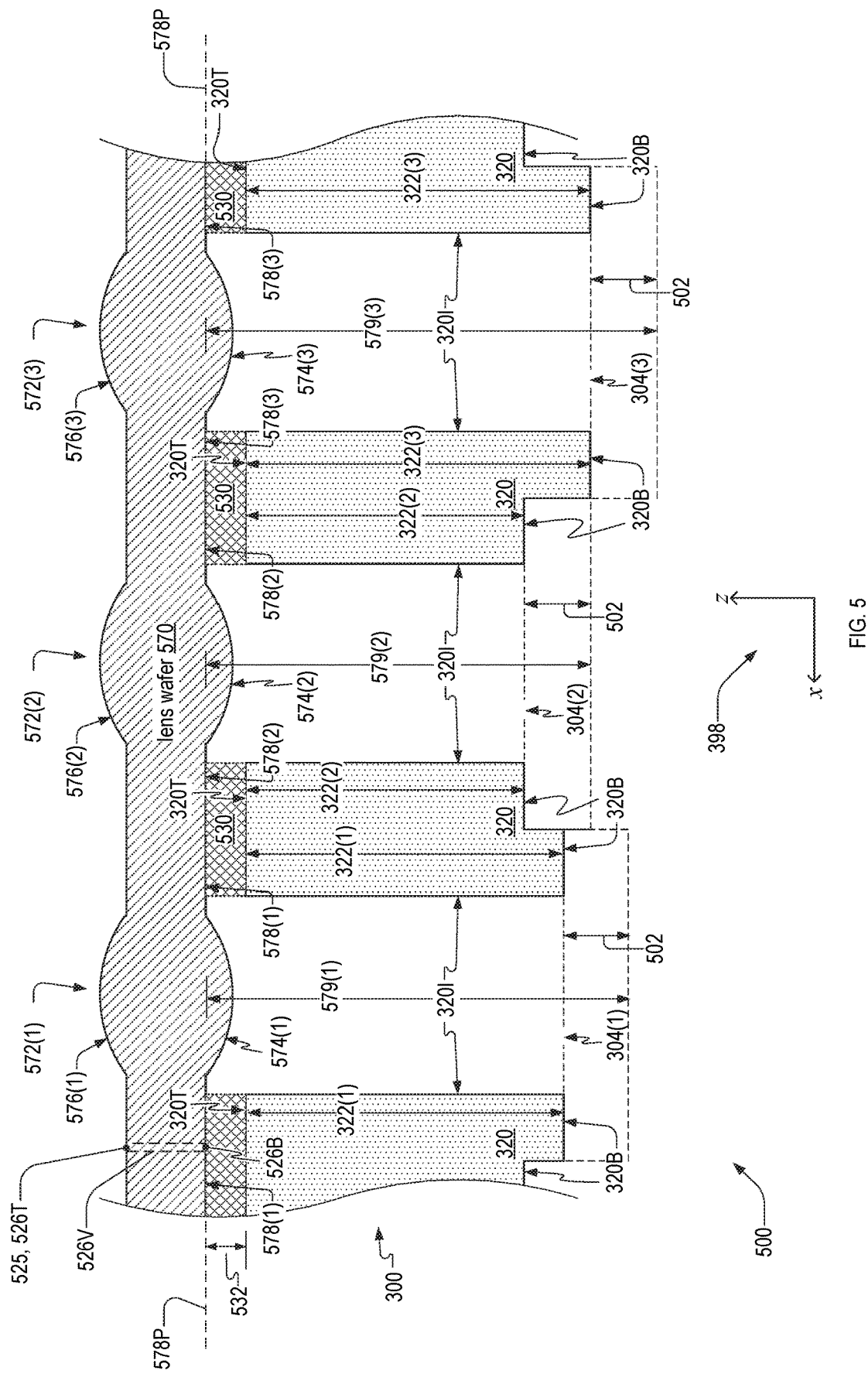
FIG. 5 is a cross-sectional view of a lens array assembly that includes a lens wafer and the stepped spacer wafer of FIGS. 3 and 4, in an embodiment.

FIG. 5 is a cross-sectional view of a lens array assembly 500 that includes stepped spacer wafer 300 and a lens wafer 570. Lens array assembly 500 may be singulated to form a plurality of lens barrels 200, FIG. 2. Lens array assembly 500 may also include a top adhesive layer 530, of which top adhesive layer 230 (FIG. 2) may be a part. Top adhesive layer 530 has a uniform thickness 532, which may be uniform to within ten micrometers. In FIG. 5, the cross-sectional view of stepped spacer wafer 300 is in a cross-sectional plane 5-5' illustrated in FIG. 4. Cross-sectional plane 5 is orthogonal to the x-y plane.

Lens wafer 570 includes a plurality of lenses 572 (1, 2, ..., N), of which lenses 572(1-3) are illustrated in FIG. 5. N is a positive integer, for example, between one hundred and ten thousand. Each lens 572($i$) has a respective back surface 574($i$), front surface 576($i$), and focal length 579($i$), where $i \in \{1, 2, \ldots, N\}$. Each back surface 574 and front surface 576 is an example of back surface 274 and front surface 276 of lens 272 of camera module 280. Focal lengths 579 are, for example, between 0.4 millimeters and 2.0 millimeters at visible electromagnetic wavelengths, where the f-number is between 2.0 and 5.0. A lens 572 may have a depth of focus of 10±2 μm. Focal lengths 579 may be outside the aforementioned range without departing from the scope hereof.

Apertures 304(1-N) of stepped spacer wafer 300 have respective thicknesses 322(1-N). Of these apertures and thicknesses which apertures 304(1-3) and thicknesses 322 (1-3) are illustrated in FIG. 5. Thicknesses 322(1-N) define a respective thickness of stepped spacer wafer 300 at least partially surrounding apertures 304(1-N), respectively. Each of thicknesses 322(1-N) is an example of thickness 222 of spacer 220. Each of thicknesses 322(1-N) is equal, within a tolerance, to a difference between (a) a respective one of the plurality of focal lengths 579(1-N), and (b) a uniform distance that is the same for each of the plurality of thicknesses 322. The tolerance is, for example, less than or equal to one micrometer.

FIG. 5 illustrates a distance 502 beneath each lens 572, the distance 502 being equal for each lens 572. Lens wafer assembly 500 may be singulated to form lens barrels 200 of camera module 280 (FIG. 2). Distance 502 may be determined by properties of camera module 280. For example, depending on whether camera module 280 includes one or both of cover glass 106 and adhesive layer 210, distance 502 may equal zero, thickness 106H, thickness 212, or the sum of thickness 106H and thickness 212. When lens wafer assembly 500 does not include adhesive layer 530, the uniform distance may equal distance 502. When lens wafer assembly includes adhesive layer 530, having thickness 532, the uniform distance equals the sum of thickness 532 and distance 502.

Lens wafer 570 includes a plurality of planar flange surfaces 578(1-N). Each planar flange surface 578 at least partially surrounds a respective one of back surfaces 574(1-N). Planar flange surfaces 578 may be in direct contact with surface 320T of slab 320. When lens wafer assembly 500 includes adhesive layer 530, planar flange surfaces 578 may be in direct contact with adhesive layer 530. Flange surfaces 578(1-N) may be coplanar, for example, in a plane 578P.

FIG. 5 denotes a reference position 525 on top-surface region 526T, which may correspond to a location of a fiducial marking on and/or in lens wafer 570. FIG. 5 denotes a top-surface region 526T between adjacent surfaces 576, a bottom-surface region 526B between adjacent back surfaces 574, and a volume 526V of lens wafer 570 therebetween. Reference position 525 may correspond to a location on lens wafer 570 within top-surface region 526T. The area of surface regions 526T and 526B may be smaller than a cross-sectional area of any aperture 304. Without departing from the scope hereof, top-surface region 526T may be part of a surface 576 and bottom-surface region 526B may be part of a back surface 574.

Figure 6:
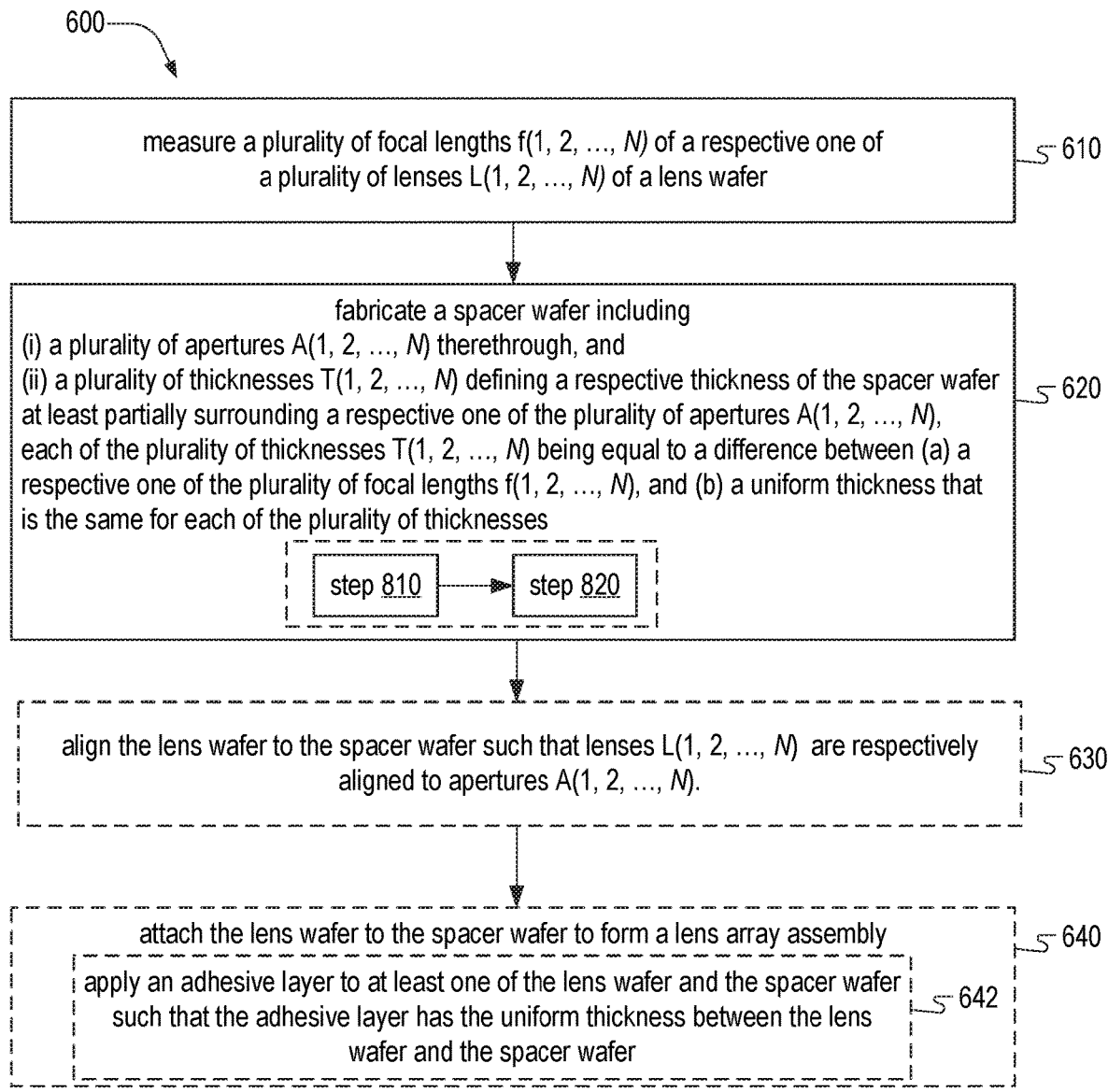
FIG. 6 is a flowchart illustrating a method for manufacturing a stepped spacer wafer for a wafer-level camera, in an embodiment.

FIG. 6 is a flowchart illustrating a method 600 for manufacturing a stepped spacer wafer for a wafer-level camera. Method 600 includes at least one of steps 610, 620, 630, and 640. Step 640 may include step 642.

Step 610 includes measuring a plurality of focal lengths $f_{1,2,\ldots,N}$ of a respective one of a plurality of lenses $L_{1,2,\ldots,N}$ of a lens wafer. Lens wafer 570 of FIG. 5 includes lenses 572(1-N), which have respective focal lengths 579 (1-N). In example of step 610, focal lengths 579(1-N) are measured.

Step 620 includes fabricating the stepped spacer wafer including (i) a plurality of apertures $A_{1,2,\ldots,N}$ therethrough, and (ii) a plurality of thicknesses $T_{1,2,\ldots,N}$ defining a respective thickness of the stepped spacer wafer at least partially surrounding a respective one of the plurality of apertures $A_{1,2,\ldots,N}$. Each of the plurality of thicknesses $T_{1,2,\ldots,N}$ is equal to a difference between (a) a respective one of the plurality of focal lengths $f_{1,2,\ldots,N}$, and (b) a uniform thickness that is the same for each of the plurality of thicknesses. In an example of step 620, stepped spacer wafer 300 is fabricated, which has the plurality of thicknesses 322 and apertures 304.

Step 630 includes aligning the lens wafer to the stepped spacer wafer such that lenses $L_{1,2,\ldots,N}$ are respectively aligned to apertures $A_{1,2,\ldots,N}$. In an example of step 630, lens wafer 570 is aligned to stepped spacer wafer 300 such that each lens 572 is aligned with a respective aperture 304.

Step 640 includes attaching the lens wafer to the stepped spacer wafer to form a lens array assembly. In an example of step 640, lens wafer 570 is attached to stepped spacer wafer 300 to form lens array assembly 500. Step 640 may include step 642, which includes applying an adhesive layer to at least one of the lens wafer and the stepped spacer wafer such that the adhesive layer has the uniform thickness between the lens wafer and the stepped spacer wafer. In an example of step 642, adhesive layer 530 is applied to at least one of lens wafer 570 and top surface 320T of stepped spacer wafer 300. Step 640 is, for example, performed after step 620, such that the stepped spacer wafer is fully formed before execution of step 640.

Figures 7, 8:
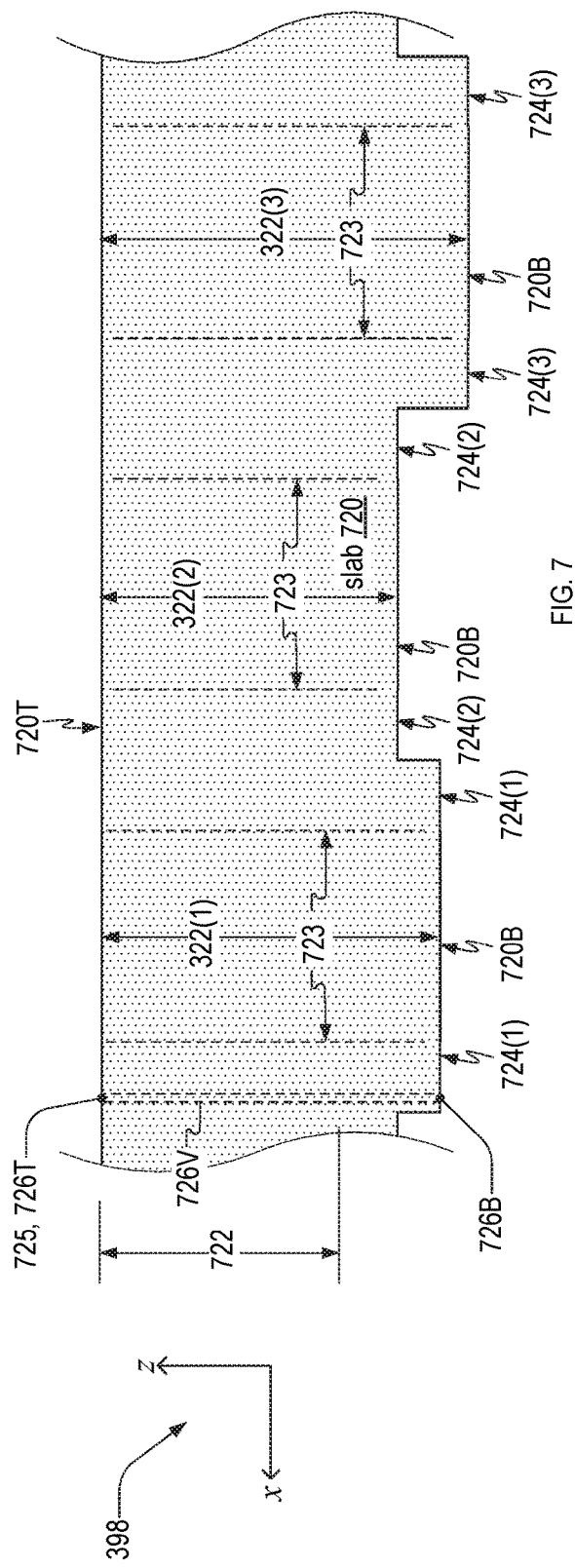
FIG. 7 is a cross-sectional view of a slab from which the stepped spacer wafer of FIG. 3 may be formed, in an embodiment.
FIG. 8 is flowchart illustrating steps that may be included in the method of FIG. 6, in an embodiment.

FIG. 7 is a cross-sectional view of a slab 720 from which stepped spacer wafer 300 may be formed. Slab 720 has a top surface 720T, a bottom surface 720B, and therebetween, the plurality of thicknesses 322(1-N) of stepped spacer wafer 300, of which thicknesses 322(1-3) are shown in FIG. 7. Vertical dashed lines 723 correspond to locations of interior surfaces 320I that define apertures 304 of stepped spacer wafer 300. Slab 720 has, at each of a plurality of locations 724(1-N) on the slab, a respective one the plurality of thicknesses 322(1-N).

FIG. 7 denotes a reference position 725 on top surface 720T, which may correspond to a location of a fiducial marking on and/or in slab 720. Reference position 725 is analogous to reference position 525 of lens wafer 570. FIG. 7 denotes a top-surface region 726T and a bottom-surface region 726B on surfaces 720T and 720B, respectively, and a volume 726V of slab 720 therebetween. Reference position 725 may correspond to a location on slab 720 within top-surface region 726T. The area of surface regions 726T and 726B may be smaller than a cross-sectional area of any aperture 304.

FIG. 7 denotes a distance 722 from top surface 720T, which is less than or equals to minimum of thicknesses 322(1-N). Slab 720 may be formed via an additive manufacturing process starting from top surface 720T. For example, slab 720 may be formed such that, at some point during the manufacturing process, the slab that is to become slab 720 includes top surface 720T and has a uniform equal to thickness 722.

Slab 720 may be formed exclusively via an additive manufacturing process such that its formation results its having the plurality of thicknesses 322 without requiring removal of any material. In an embodiment, slab 720 may include apertures 304 at locations between adjacent vertical dashed lines 723 located at a same location 724 and thickness 322. In this embodiment, slab 720 is equivalent to spacer wafer 300. That is, slab 720 may be formed exclusively via an additive manufacturing process such that its formation results in stepped spacer wafer 300 having apertures 304, during which no material had been removed to form apertures 304. Hence, stepped spacer wafer 300 may be formed exclusively via an additive manufacturing process and not require any subtractive processes, e.g., removal of material to form apertures 304.

FIG. 8 is flowchart illustrating steps 810 and 820 that may be included in step 620 of method 600. In steps 810 and 820, the plurality of lenses $L_{1,2,\ldots,N}$ of the lens wafer are located at a respective one of a plurality of locations $R_{1,2,\ldots,N}$ on the lens wafer relative to a lens-wafer reference position on the lens wafer. At least one of steps 810 and 820 may be executed using an additive manufacturing process. For example, steps 810 and 820 may be executed in parallel, for example, when both steps 810 and 820 are executed using an additive manufacturing process. Alternatively, step 820 may be performed after step 810.

Step 810 includes forming a slab having, at each of a plurality of locations $B_{1,2,\ldots,N}$ on the slab, a respective one the plurality of thicknesses $T_{1,2,\ldots,N}$. When a lens-wafer reference position on the lens wafer is aligned to a reference position on the, each of the plurality of locations $B_{1,2,\ldots,N}$ is most proximate to the respective location $R_{1,2,\ldots,N}$. In an example of step 810, slab 720 is formed, where locations 724(1-N) and thicknesses 322(1-N) correspond to locations $B_{1,2,\ldots,N}$ and thicknesses $T_{1,2,\ldots,N}$ respectively. In this example, slab 720 is positioned with respect to lens wafer 570 such that (a) surfaces 578 of lens wafer 570 face top surface 720T, (b) plane 578P is parallel to top surface 720T, and (c) reference position 525 is aligned to reference position 725. In such a configuration, each location 724($i$) of the plurality locations 724(1-N) is most proximate to the respective lens 572($i$) of the plurality of lenses 572, $i \in \{1, 2, \ldots, N\}$.

Step 820 includes forming each of the plurality of apertures $A_{1,2,\ldots,N}$ through the slab at a respective one of the plurality locations $B_{1,2,\ldots,N}$. In an example of step 820, apertures 304(1-N) are formed at respective locations 724(1-N) on slab 720 to yield stepped spacer wafer 300.

Combinations of Features

Features described above as well as those claimed below may be combined in various ways without departing from the scope hereof. The following examples illustrate some possible, non-limiting combinations:

A method denoted by (A1) for manufacturing a stepped spacer wafer for a wafer-level camera includes a step of measuring a plurality of focal lengths $f_{1,2,\ldots,N}$ of a respective one of a plurality of lenses $L_{1,2,\ldots,N}$ of a lens wafer. The method also includes a step of fabricating the stepped spacer wafer including (i) a plurality of apertures $A_{1,2,\ldots,N}$ therethrough, and (ii) a plurality of thicknesses $T_{1,2,\ldots,N}$ defining a respective thickness of the stepped spacer wafer at least partially surrounding a respective one of the plurality of apertures $A_{1,2,\ldots,N}$. Each of the plurality of thicknesses $T_{1,2,\ldots,N}$ is equal to a difference between (a) a respective one of the plurality of focal lengths $f_{1,2,\ldots,N}$, and (b) a uniform thickness that is the same for each of the plurality of thicknesses.

(A2) In any method denoted by (A1), the step of fabricating may include a step of forming a slab having, at each of a plurality of locations $B_{1,2,\ldots,N}$ on the slab, a respective one the plurality of thicknesses $T_{1,2,\ldots,N}$. When a lens-wafer reference position on the lens wafer is aligned to a reference position on the slab, each location $B_i$ of the plurality locations $B_{1,2,\ldots,N}$ is most proximate to the respective lens $L_i$ of the plurality of lenses $L_{1,2,\ldots,N}$, $i \in \{1, 2, \ldots, N\}$. The step of fabricating may include a step of forming each aperture $A_i$ of the plurality of apertures $A_{1,2,\ldots,N}$ through the slab at a respective location $B_i$ of the plurality locations $B_{1,2,\ldots,N}$.

(A3) In a method denoted by (A2), the step of forming each aperture may be performed after the step of forming the slab.

(A4) In any method denoted by (A2), the steps of forming the slab and forming each aperture being performed using an additive manufacturing process.

(A5) Any method denoted by one of (A1) through (A4) may further include aligning the lens wafer to the stepped spacer wafer such that lenses $L_{1,2,\ldots,N}$ are respectively aligned to apertures $A_{1,2,\ldots,N}$.

(A6) Any method denoted by (A5) may further include, after the step of aligning: attaching the lens wafer to the stepped spacer wafer to form a lens array assembly.

(A7) In any method denoted by (A5), the step of attaching may include applying an adhesive layer to at least one of the lens wafer and the stepped spacer wafer such that the adhesive layer has the uniform thickness between the lens wafer and the stepped spacer wafer.

(A8) In the step of fabricating of any method denoted by one of (A1) through (A7): (a) the lens wafer may have a plurality of surface regions, coplanar in a first plane, and each located between a respective pair of adjacent lenses of the plurality of lenses, and (b) each lens of the plurality of lenses may have a respective one of a plurality of principal planes coplanar in a second plane that is parallel to the first plane and spaced therefrom by the uniform thickness.

(A9) In any method denoted by one of (A1) through (A8), the step of fabricating the stepped spacer wafer may be performed via an additive manufacturing process.

(A10) In any method denoted by one of (A1) through (A9), in the step of fabricating, the stepped spacer wafer may be physically separated from the lens wafer.

(B1) A lens array assembly denoted as (B1) includes a lens wafer and a stepped spacer wafer. The lens wafer includes a plurality of lenses $L_{1,2,\ldots,N}$ arranged in a two-dimensional array, each having a respective focal length $f_{1,2,\ldots,N}$. The stepped spacer wafer includes (i) a plurality of apertures $A_{1,2,\ldots,N}$ therethrough, and (ii) a plurality of thicknesses $T_{1,2,\ldots,N}$ defining a respective thickness of the stepped spacer wafer at least partially surrounding a respective one of the plurality of apertures $A_{1,2,\ldots,N}$. Each of the plurality of thicknesses $T_{1,2,\ldots,N}$ is equal to a difference between (a) a respective one of the plurality of focal lengths $f_{1,2,\ldots,N}$, and (b) a uniform thickness that is the same for each of the plurality of thicknesses.

(B2) In the lens array assembly denoted by (B1), lenses $L_{1,2,\ldots,N}$ may be respectively aligned to apertures $A_{1,2,\ldots,N}$.

(B3) In a lens array assembly denoted by one of (B1) and (B2) may further include, between the lens wafer and the stepped spacer wafer, an adhesive layer having the uniform thickness.

(B4) In a lens array assembly denoted by one of (B1) through (B3), the lens wafer may have a plurality of surface regions, coplanar in a first plane, and each located between a respective pair of adjacent lenses of the plurality of lenses. Each lens of the plurality of lenses may have a respective one of a plurality of principal planes coplanar in a second plane that is parallel to the first plane and spaced therefrom by the uniform thickness.

Changes may be made in the above methods and systems without departing from the scope hereof. It should thus be noted that the matter contained in the above description or shown in the accompanying drawings should be interpreted as illustrative and not in a limiting sense. Herein, and unless otherwise indicated, the adjective "exemplary" means serving as an example, instance, or illustration. The following claims are intended to cover all generic and specific features described herein, as well as all statements of the scope of the present method and system, which, as a matter of language, might be said to fall therebetween.

What is claimed is:

1. A method for manufacturing a stepped spacer wafer for a wafer-level camera, comprising steps of:

measuring a plurality of focal lengths $f_{1,2,\ldots,N}$ of a respective one of a plurality of lenses $L_{1,2,\ldots,N}$ of a lens wafer; and fabricating the stepped spacer wafer including (i) a plurality of apertures $A_{1,2,\ldots,N}$ therethrough, and (ii) a plurality of thicknesses $T_{1,2,\ldots,N}$ defining a respective thickness of the stepped spacer wafer at least partially surrounding a respective one of the plurality of apertures $A_{1,2,\ldots,N}$, each of the plurality of thicknesses $T_{1,2,\ldots,N}$ being equal to a difference between (a) a respective one of the plurality of focal lengths $f_{1,2,\ldots,N}$, and (b) a uniform thickness that is the same for each of the plurality of thicknesses;

aligning the lens wafer to the stepped spacer wafer such that lenses $L_{1,2,\ldots,N}$ are respectively aligned to apertures $A_{1,2,\ldots,N}$; and after the step of aligning, attaching the lens wafer to the stepped spacer wafer to form a lens array assembly, attaching including applying an adhesive layer to (i) a planar flange surface of the lens wafer and (ii) the stepped spacer wafer such that the adhesive layer has the uniform thickness between the lens wafer and the stepped spacer wafer.

2. The method of claim 1, further comprising steps of:

forming a slab having, at each of a plurality of locations $B_{1,2,\ldots,N}$ on the slab, a respective one the plurality of thicknesses $T_{1,2,\ldots,N}$, when a lens-wafer reference position on the lens wafer is aligned to a reference position on the slab, each location $B_i$ of the plurality locations $B_{1,2,\ldots,N}$ being most proximate to the respective lens $L_i$ of the plurality of lenses $L_{1,2,\ldots,N}$, $i \in \{1, 2, \ldots, N\}$;

forming each aperture $A_i$ of the plurality of apertures $A_{1,2,\ldots,N}$ through the slab at a respective location $B_i$ of the plurality locations $B_{1,2,\ldots,N}$.

3. The method of claim 2, the step of forming each aperture being performed after the step of forming the slab.

4. The method of claim 2, the steps of forming the slab and forming each aperture being performed using an additive manufacturing process.

5. The method of claim 1, the step of fabricating the stepped spacer wafer-being performed via an additive manufacturing process.

6. The method of claim 1, further comprising executing the step of fabricating while the stepped spacer wafer is physically separated from the lens wafer.

7. A lens array assembly comprising:

a lens wafer including (i) plurality of lenses $L_{1,2,\ldots,N}$ arranged in a two-dimensional array, each having a respective focal length $f_{1,2,\ldots,N}$ and a respective back surface, and (ii) a plurality of planar flange surfaces each at least partially surrounding the back surface of a respective one of the plurality of lenses;

a stepped spacer wafer including (i) a plurality of apertures $A_{1,2,\ldots,N}$ therethrough, and (ii) a plurality of thicknesses $T_{1,2,\ldots,N}$ defining a respective thickness of the stepped spacer wafer at least partially surrounding a respective one of the plurality of apertures $A_{1,2,\ldots,N}$ each of the plurality of thicknesses $T_{1,2,\ldots,N}$ being equal to a difference between (a) a respective one of the plurality of focal lengths $f_{1,2,\ldots,N}$, and (b) a uniform thickness that is the same for each of the plurality of thicknesses; and an adhesive layer having the uniform thickness between each of the plurality of planar flange surfaces and the stepped spacer wafer.

8. The lens array assembly of claim 7, lenses $L_{1,2,\ldots,N}$ being respectively aligned to apertures $A_{1,2,\ldots,N}$.

* * * * *